US009939945B2

(12) United States Patent
Kono

(10) Patent No.: US 9,939,945 B2
(45) Date of Patent: Apr. 10, 2018

(54) ELECTRONIC DEVICE

(71) Applicant: KYOCERA CORPORATION, Kyoto-shi, Kyoto (JP)

(72) Inventor: Kenji Kono, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 102 days.

(21) Appl. No.: 14/388,272

(22) PCT Filed: Mar. 26, 2013

(86) PCT No.: PCT/JP2013/002050
§ 371 (c)(1),
(2) Date: Sep. 26, 2014

(87) PCT Pub. No.: WO2013/145719
PCT Pub. Date: Oct. 3, 2013

(65) Prior Publication Data
US 2015/0116233 A1 Apr. 30, 2015

(30) Foreign Application Priority Data

Mar. 26, 2012 (JP) .................. 2012-069239
Mar. 26, 2012 (JP) .................. 2012-069242

(51) Int. Cl.
G06F 3/041 (2006.01)
G06F 3/045 (2006.01)
G06F 3/01 (2006.01)

(52) U.S. Cl.
CPC ............ *G06F 3/0414* (2013.01); *G06F 3/016* (2013.01); *G06F 3/041* (2013.01); *G06F 3/0416* (2013.01);
(Continued)

(58) Field of Classification Search
CPC ...... G06F 3/016; G06F 3/0414; G06F 3/0416; G06F 3/044
See application file for complete search history.

(56) References Cited

U.S. PATENT DOCUMENTS

2004/0125079 A1* 7/2004 Kaneko ............... G01L 1/205
345/156
2010/0053116 A1* 3/2010 Daverman ............ G06F 3/0414
345/175
(Continued)

FOREIGN PATENT DOCUMENTS

JP 2008-287575 A 11/2008
JP 2009-163363 A 7/2009
(Continued)

OTHER PUBLICATIONS

International Search Report dated Jul. 2, 2013 in International Application No. PCT/JP2013/002050.
(Continued)

*Primary Examiner* — Nan-Ying Yang
(74) *Attorney, Agent, or Firm* — Hauptman Ham, LLP

(57) ABSTRACT

Provided is an electronic device that can appropriately perform process in response to the position of a press (contact) by a user.
The electronic device 1 includes a touch panel 10 configured to detect a contact, a controller 80 configured to obtain a position of the contact detected by the touch panel 10, and pressure detectors 20-1 to 20-8 configured to detect a pressure on the touch panel 10, in which a plurality of pressure detectors 20-1 to 20-8 are mounted on the touch panel 10, and the controller 80 chooses a pressure detector that detects a pressure on the touch panel 10 in response to the position of a contact obtained.

4 Claims, 6 Drawing Sheets

(52) U.S. Cl.
CPC .. G06F 3/0418 (2013.01); *G06F 2203/04105* (2013.01)

(56) References Cited

U.S. PATENT DOCUMENTS

| | | | |
|---|---|---|---|
| 2010/0099394 A1* | 4/2010 | Hainzl | G06F 1/32 455/418 |
| 2011/0169758 A1 | 7/2011 | Aono | |
| 2012/0050209 A1* | 3/2012 | King | G06F 3/0416 345/174 |
| 2012/0162114 A1 | 6/2012 | Inoue et al. | |
| 2013/0194208 A1 | 8/2013 | Miyanaka et al. | |

FOREIGN PATENT DOCUMENTS

| | | |
|---|---|---|
| JP | 4633183 B1 | 2/2011 |
| JP | 201148698 A | 3/2011 |
| JP | 201214340 A | 1/2012 |
| JP | 5087723 B1 | 12/2012 |

OTHER PUBLICATIONS

Written Opinion dated Jul. 2, 2013 in International Application No. PCT/JP2013/002050.

Office Action dated Jul. 21, 2015, corresponding to Japanese patent application No. 2012-069239, for which an explanation of relevance is attached.

Office Action dated Jul. 21, 2015, corresponding to Japanese patent application No. 2012-069242, for which an explanation of relevance is attached.

\* cited by examiner

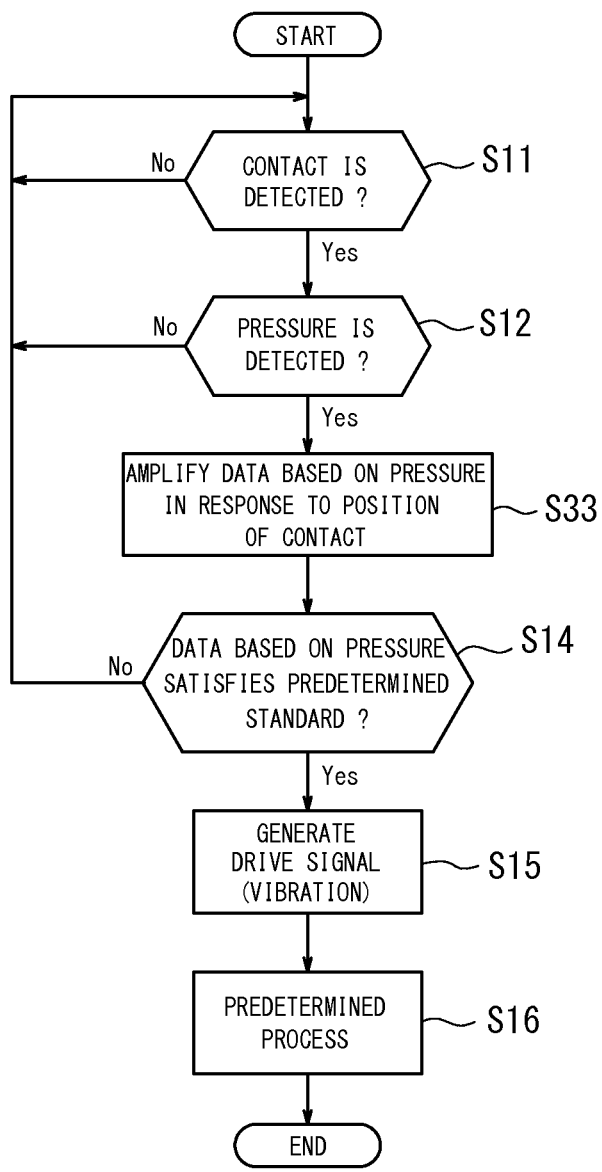

ELECTRONIC DEVICE

The present application is a National Phase of International Application Number PCT/JP2013/002050, filed Mar. 26, 2013, and claims the priority of Japanese Patent Application Nos. 2012-069239 and 2012-069242 filed on Mar. 26, 2012, the content of which is entirely incorporated herein by reference.

TECHNICAL FIELD

The present invention relates to an electronic device with a touch panel.

BACKGROUND ART

In recent years, as a member that detects a contact by a user, an electronic device with a touch panel has been widely used to the information equipment such as mobile terminals like mobile phones, tablet-type PCs, calculators and ticket vending machines, home appliances such as microwaves, TV sets and lighting equipment, and industrial equipment (FA equipment).

As such a touch panel, various types such as a resistive film type, a capacitive type and an optical type are known. However, any types of touch panel are used to detect operation by a finger or a stylus pen, and even if a touch panel is touched, the touch panel itself is not physically displaced like a push button switch. Thus, even if a user operates the touch panel, he/she cannot obtain a feedback to the operation.

Thus, a feedback method by which, when operation on the touch panel is detected, a vibration is generated has been suggested (see Patent Literature 1). The input apparatus described in Patent Literature 1 includes a pressure detector (load detector), and is configured such that the pressure detector detects a pressure by the operation on the touch panel. In such a configuration, when a detected pressure satisfies a predetermined standard (for providing a tactile sensation), a vibrator is driven to vibrate the touch panel, thereby providing a tactile sensation to a user's finger or the like. In addition, in that case, when the position where a contact is detected corresponds to a position of a predetermined object such as a key displayed on a display, a predetermined process such as execution of predetermined application software associated with the object may be performed.

Thus, when a user presses the touch panel intentionally, not lightly touches it, a tactile sensation is provided and a predetermined process is performed. Therefore, in this manner, an unintentional light touch on the touch panel by a user may not cause execution of unintentional process by a user or provision of a strange tactile sensation to a user.

CITATION LIST

Patent Literature

PTL 1: JP4633183 (B1)

SUMMARY OF INVENTION

Technical Problem

On a normal touch panel, even if a press by a user's finger or the like is performed with the same force, when the press is detected on different positions on the touch panel, the detection value (data based on pressure) detected by a pressure detector may differ.

The present invention has been conceived in light of the above circumstances and provides an electronic device capable of appropriately performing a process in response to the position pressed (touched) by a user.

Solution to Problem

An invention of an electronic device according to a first aspect to achieve the above mentioned object includes:
 a touch panel configured to detect a contact;
 a controller configured to obtain a position of the contact detected by the touch panel; and
 a pressure detector configured to detect a pressure on the touch panel, wherein
 the pressure detector is mounted more than one in number on the touch panel;
 the controller chooses a pressure detector for detecting a pressure on the touch panel, from among the more than one pressure detectors, in response to the position of the contact obtained.

An invention of an electronic device according to a second aspect to achieve the above mentioned object includes:
 a touch panel configured to detect a contact; and
 a controller configured to perform a predetermined process on the basis of data based on pressure on the touch panel, wherein
 the controller controls a gain for the data based on pressure in response to a position of the contact detected by the touch panel.

According to the electronic device of the present invention, a process can be performed appropriately in response to the position pressed (touched) by a user.

BRIEF DESCRIPTION OF DRAWINGS

FIG. 6 is a flowchart illustrating a process by the electronic device according to the third embodiment of the present invention.

DESCRIPTION OF EMBODIMENTS

First Embodiment

Figure 1:
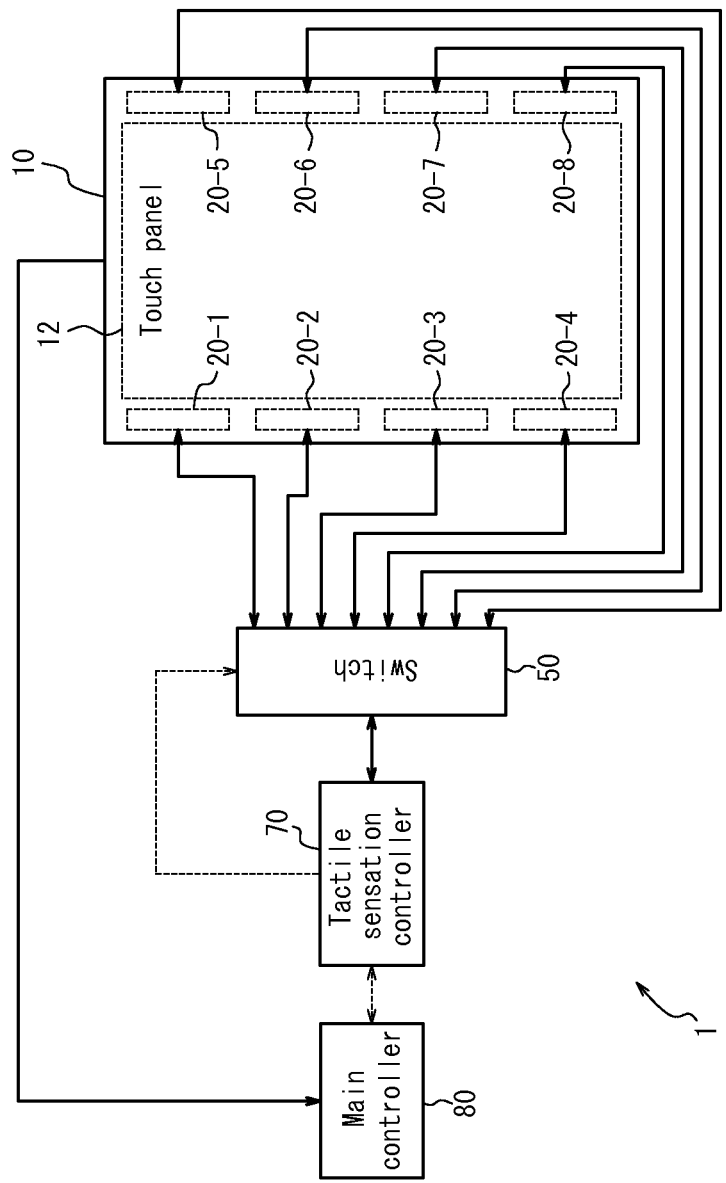
FIG. 1 is a function block diagram of an electronic device according to a first embodiment of the present invention.

A first embodiment of an electronic device according to the present invention will be described below with reference to the drawings.

Here, the technical problem according to the present embodiment will be described again in detail below.

On a normal touch panel, even if a press by a user's finger or the like is performed with the same force, when the press is detected on different positions on the touch panel, the detection value (data based on pressure) detected by a pressure detector may differ. Here, the detection value detected by the pressure detector can be, when the pressure detector is configured using a piezoelectric element, a voltage value output from the piezoelectric element. In addition, when the pressure detector is configured using a piezoelectric element, a voltage is applied to the piezoelectric element to vibrate it, thus the pressure detector can also serve as a vibrator. As mentioned above, the detected value of a pressure differs depending on the position on the touch panel for various factors, such as the distance between the position where a pressure is detected on the touch panel and each pressure detector, and elastic modulus of the members constituting the touch panel.

In an input apparatus described in the above mentioned Patent Literature 1, as a pressure detector (load detector), four strain gauge sensors are disposed close to each side edge of the touch sensor (see FIG. 6(b) of Patent Literature 1). In the electronic device including such an input apparatus, for example, if a relatively large touch panel is employed, it is preferred that the number of piezoelectric elements be increased to detect a pressure with accuracy on each position on the touch panel.

However, when a pressure detector is configured by using many piezoelectric elements in this manner, if many piezoelectric elements are controlled by a few ICs (tactile sensation controller) to determine whether a tactile sensation is provided or not, a pressure on the touch panel may not be detected appropriately. This is because, as mentioned above, even if a press by a user is performed with the same force, when the press is detected on different positions on the touch panel, data based on pressure detected by a plurality of pressure detectors is not always the same.

Therefore, for example, in the case where the average of the voltage values output from all of the piezoelectric elements is used as a detection value detected by the pressure detector, when a user presses one point on the touch panel, some positions on the touch panel are deformed greatly and some are deformed a little. In this case, a large voltage value output from the piezoelectric element located on the position on the touch panel where deformation is large is also averaged by a voltage value output from the piezoelectric element located on the other position where deformation is small, and thus the large voltage value is reduced.

Therefore, in the present embodiment, even if a plurality of pressure detectors are mounted, data based on pressure should be obtained appropriately.

The electronic device according to the present invention can be a mobile phone, a tablet PC, a laptops or the like that has a touch panel. However, the present invention is not limited to these mobile type equipment, and can be various electronic devices such as a desktop PC, home appliances, industrial equipment (FA equipment) and a dedicated terminal or the like that has a touch panel.

FIG. 1 is a function block diagram of an electronic device according to a first embodiment of the present invention.

As illustrated in FIG. 1, an electronic device 1 includes a touch panel 10, pressure detectors 20-1 to 20-8, a switch 50, a tactile sensation controller 70 and a main controller 80.

The touch panel 10 detects a contact by a user's finger, a stylus pen or the like on its touch face, and can be a resistive film type, a capacitive type, an optical type or the like. The touch panel 10 outputs the information on the position on the touch face where a user's finger, a stylus pen or the like touches. Through this output, the main controller 80 can obtain the position of a contact detected by the touch panel 10.

Note that, the touch panel 10 may be configured using, for example, a transparent member, and on the back side thereof, a display 12 (illustrated inside the touch panel 10 by a broken line in FIG. 1) configured using a liquid crystal display (LCD) or an organic EL display or the like is mounted. In this case, for example, objects such as, for example, a key and a button may be drawn and displayed on the display 12, and an operation of pressing the object by a user can be detected on the touch panel 10.

In addition, it is preferred that the touch panel 10 be vibratably mounted on a housing an appropriate means. That is, if all side edges of the touch panel 10 are fixed firmly to the housing or the like, an amplitude for vibrating the touch panel 10 cannot be gained, thus an appropriate tactile sensation cannot be provided to a user. Therefore, for example, the touch panel 10 is mounted on the housing via an elastic member or is partially fixed to the housing, thus the touch panel 10 is vibratably mounted on the housing.

The pressure detectors 20-1 to 20-8 detect a pressure by a user's finger or the like on the touch face of the touch panel 10, and can be configured using an element that reacts linearly to a load, such as, for example, a strain gauge sensor and a piezoelectric element.

For example, if each pressure detector 20 is configured using a piezoelectric element, the magnitude of a voltage (voltage value) to be output changes, due to the electrical characteristics of the piezoelectric element, in response to the magnitude of a load (force) of pressure (or the speed at which the magnitude of load (force) changes (acceleration)) on the touch face of the touch panel 10. In this case, the pressure detector 20 can notify the tactile sensation controller 70 of the magnitude of the voltage (voltage value (hereinafter referred to merely as data)). The tactile sensation controller 70 obtains the data when the pressure detector 20 notifies the tactile sensation controller 70 of the data or the tactile sensation controller 70 detects the data relating to the piezoelectric element of the pressure detector 20. That is, the tactile sensation controller 70 obtains the data based on pressure from the pressure detector 20, thereby obtaining the data based on pressure by a user on the touch face of the touch panel.

In the example illustrated in FIG. 1, the pressure detectors 20 are disposed longitudinally (vertically) along the side edges of the touch panel, 4 units on each side, 8 units in total. Note that, in FIG. 1, each pressure detector 20 is illustrated by a broken line, which indicates that each of these pressure detectors 20 is disposed on the back side of the touch panel 10. However, disposal of the pressure detectors 20 is not limited to the example illustrated in FIG. 1, and the pressure detectors 20 may be disposed in various manners depending on various factors such as shape and disposal mode of the touch panel 10, the mode of pressure to be detected by the touch panel 10 and the mode of tactile sensation to be provided by the electronic device 1. In addition, the number of pressure detectors 20 to be disposed is not limited to 4, and any plural number of detectors 20 may be disposed.

Note that when the pressure detectors 20-1 to 20-8 are configured using piezoelectric elements, a predetermined drive signal is supplied from the tactile sensation controller 70 to these piezoelectric elements, thus these piezoelectric elements are vibrated and a tactile sensation is provided to a user's finger or the like. Therefore, in this case, the pressure detectors 20-1 to 20-8 can be functioned also as a tactile sensation provider. In the present embodiment, the tactile sensation provider may be provided as a member separated from the pressure detectors 20-1 to 20-8. However, in the description below, the pressure detector 20 is configured using a piezoelectric element, thus the pressure detector 20 serves also as a tactile sensation provider.

As illustrated in FIG. 1, the switch 50 is connected between the touch panel 10 on which a plurality of pressure detectors 20 are mounted and the tactile sensation controller 70. As illustrated in FIG. 1, in the present embodiment, a plurality of pressure detectors 20-1 to 20-8 are respectively connected to the switch 50. The switch 50 may be configured using any switching element or the like.

With such a configuration, the switch 50 switches a signal path such that a drive signal output from the tactile sensation controller 70 can be supplied to each of the pressure detectors 20-1 to 20-8. Due to the drive signal supplied in this manner, the pressure detectors 20-1 to 20-8 that serve as a tactile sensation provider generate a vibration, thereby providing a tactile sensation to a user's finger or the like. In addition, the switch 50 switches the signal path such that the signal detected by each of pressure detectors 20-1 to 20-8 will be supplied to the tactile sensation controller 70. Switch of the signal path by the switch 50 can be performed based on the control of the tactile sensation controller 70.

The main controller 80 controls and manages the whole electronic device 1 as well as each function unit of the electronic device 1. As illustrated in FIG. 1, the main controller 80 can obtain a position of a contact detected by the touch panel 10. In the present embodiment, the main controller 80 chooses a pressure detector for detecting a pressure on the touch panel 10, from among the plurality of pressure detectors 20-1 to 20-8, in response to the position of the contact detected by the touch panel 10 and obtained by the controller 80. Such a process by the main controller 80 according to the present embodiment will be described later.

The tactile sensation controller 70 controls the switch 50 based on the control by the main controller 80. In FIG. 1, the arrow of broken line connecting each function block represents mainly a flow of control signal. In addition, the tactile sensation controller 70 can supply a drive signal for vibrating the pressure detector 20 that serves as a tactile sensation provider via the switch 50. Furthermore, the tactile sensation controller 70 can obtain data based on pressure detected by the pressure detector 20 via the switch 50. Note that the main controller 80 may control the switch 50.

In the present embodiment, the main controller 80 controls, when the data based on pressure on the touch panel 10 that is input to the tactile sensation controller 70 satisfies a predetermined standard, such that a predetermined process is performed. That is, the main controller 80 performs a predetermined process based on the data based on pressure on the touch panel 10. Here, the predetermined process can be a process of, for example, vibrating the pressure detector 20 serving as a tactile sensation provider to provide a tactile sensation. In addition, the predetermined process can be a process of executing predetermined application software along with provision of such a tactile sensation or instead thereof. In this case, in the predetermined process, if the position where a contact is detected corresponds to the position of a predetermined object such as a key displayed on the display, the predetermined application software is executed. Note that such a process may be performed by the tactile sensation controller 70.

Next, a process according to the present embodiment will be described.

Figure 2:
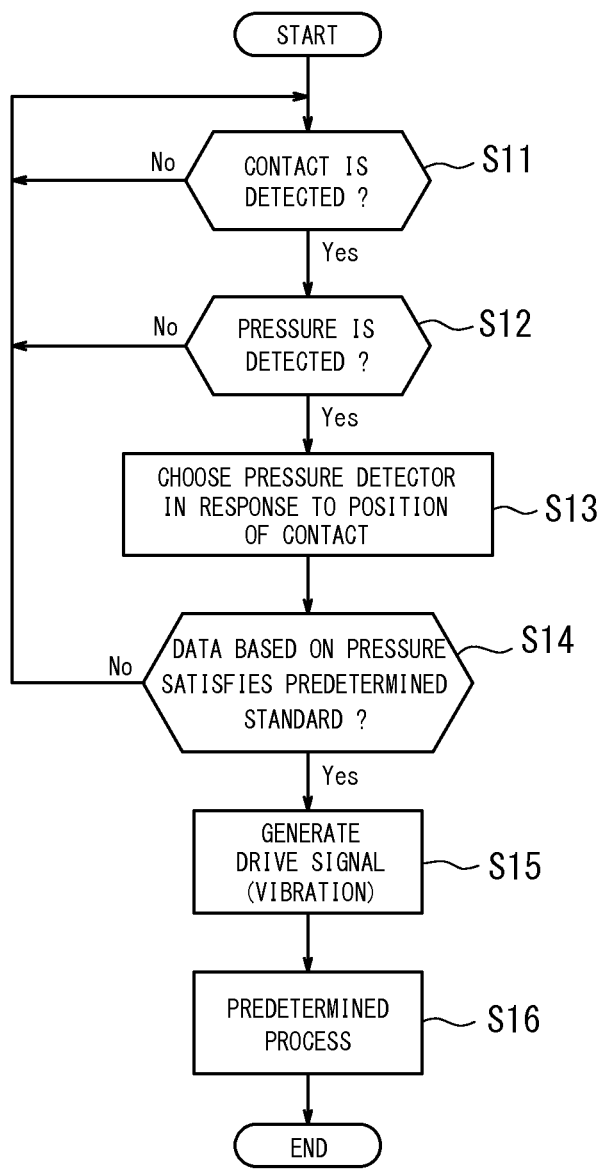
FIG. 2 is a flowchart illustrating a process by the electronic device according to the first embodiment of the present invention.

FIG. 2 is a flowchart illustrating a process by the electronic device 1 according to the first embodiment. When the process according to the present embodiment illustrated in FIG. 2 is started, the main controller 80 controls such that a predetermined object such as a key is displayed on the display 12 and an operation by a user to the object is detected.

In addition, in the process according to the present embodiment illustrated in FIG. 2, if the detection value of a pressure detected by the pressure detector 20 satisfies a predetermined standard, the main controller 80 controls the tactile sensation controller 70 to cause the pressure detector 20 serving as a tactile sensation provider to provide a tactile sensation. Such a predetermined standard to be satisfied by a detection value detected by the pressure detector 20 when providing a tactile sensation is previously determined, for example, based on a pressure during normal operation of the touch panel 10 by a user. In addition, it is preferred that such a predetermined standard be changed appropriately after it is set to suit the preferences of a user.

When the process according to the present embodiment is started, the main controller 80 determines whether or not a contact by a user's finger or the like is detected on the position on the touch panel 10 that corresponds to the area where a predetermined object is displayed on the display 12 (step S11).

When a contact is detected on the touch panel 10 in step S11, the main controller 80 determines whether or not the pressure detector 20 detects a pressure (step S12). Note that, in step S12, for example, the tactile sensation controller 70 determines whether or not a pressure on the pressure detector 20 is detected, and only the result of the determination may be notified to the main controller 80. Furthermore, after step S11, the process may proceed to step S13 without performing a process of step S12.

When a pressure is detected in step S12, the main controller 80 obtains a position where a contact is detected on the touch panel 10, and controls such that a pressure detector for detecting a pressure on the touch panel 10 will be chosen from among a plurality of pressure detectors 20-1 to 20-8, in response to the detected contact position (step S13). Note that when the position where a contact is detected on the touch panel 10 has already been obtained in step S11, it is not necessary to obtain a position of a contact again in step S13.

In order to realize the process of step S13, a corresponding relationship between the position where a contact is detected and the pressure detector for detecting a detection signal of pressure (data based on pressure) chosen from among a plurality of pressure detectors 20-1 to 20-8 is stored in, for example, a memory unit built in the main controller 80. It is assumed that such a corresponding relationship may differ depending on various conditions such as the touch panel 10, the pressure detector 20 and the housing, and the manner each of these members is joined. However, in general, it is expected that, among the plurality of pressure detectors 20-1 to 20-8, the one located closest to the position where a contact is detected is the most appropriate pressure detector for detecting the data based on pressure. Therefore, for example, among the pressure detectors 20-1 to 20-8, the one located closest to the position where a contact is detected on the touch panel 10 can be chosen as a pressure detector for detecting a pressure on the touch panel 10. In addition, for example, the face where a contact is detected on the touch panel 10 may be divided into eight portions corresponding to the plurality of pressure detectors 20-1 to 20-8. In this case, when a contact is detected in each of these divided eight portions, a pressure detector corresponding to each portion may be chosen as a pressure detector for detecting a pressure on the touch panel 10. In addition, for example, upon determination of configuration manner of each of members constituting the electronic device 1, the corresponding relationship may be obtained based on experimental measurements.

It is preferred that how in detail such a corresponding relation is defined with respect to the position where a contact is detected be determined based on the configuration manner of the electronic device 1 and various requirements. For example, in some configuration manners of each member constituting the electronic device 1, the detection value of a pressure may not differ so much even if a contact is detected on positions that differ to some extent. On the other hand, in some configuration manners of each member constituting the electronic device 1, the detection value of a pressure may differ much when a contact is detected on positions that differ just a little bit.

When a pressure detector is chosen in step S13, the main controller 80 determines whether or not the data based on pressure detected by the chosen pressure detector 20 satisfies the predetermined standard (step S14). Here, when the data based on pressure satisfies the predetermined standard may be when the data based on pressure reaches the predetermined standard, the data based on pressure exceeds the predetermined standard or the data based on pressure that is equal to the predetermined standard is detected.

In step S14, if the data based on pressure does not satisfy the predetermined standard, the main controller 80 returns to step S11 to determine whether or not a contact on the touch panel 10 is detected. Note that, even if a pressure is not detected in step S12, the main controller 80 performs the same process.

In step S14, if the data based on pressure satisfies the predetermined standard, the main controller 80 controls the tactile sensation controller 70 to generate a predetermined drive signal and the pressure detector 20 serving as a tactile sensation provider to generate a vibration (step S15).

When a vibration is generated in step S15, the main controller 80 performs a predetermined process such as execution of predetermined application software associated with the object that corresponds to the position where a contact is detected (step S16).

In this manner, in the present embodiment, the main controller 80 chooses a pressure detector 20 for detecting a pressure on the touch panel 10 in response to the position of a contact detected by the touch panel 10 and obtained by the controller 80. Therefore, according to the present embodiment, a pressure detector 20 for detecting a pressure is chosen by taking the position of a pressure on the touch panel 10 into consideration, thus even if a plurality of pressure detectors 20 are mounted, data based on pressure can be obtained appropriately.

Second Embodiment

Next, the second embodiment of an electronic device according to the present invention will be described.

According to the second embodiment of the present invention, amplifiers are further mounted on the electronic device 1 described in the first embodiment. Other than this point, an electronic device 2 according to the second embodiment can be realized by the configuration that is basically the same as the electronic device 1 described in the first embodiment. Thus, the same description as that described in the first embodiment is omitted as appropriate.

As mentioned above, in the electronic device in the past, when it is configured by using a relatively large number of pressure detectors, for example, if detection values that are output respectively from all of the piezoelectric elements are averaged, the values are reduced. Whether or not such averaging of detection values is performed, if the detection value is small, it is preferred that the detection signal detected by the pressure detector be amplified by an amplifier, then after that, be input to the tactile sensation controller.

However, if a voltage value is amplified by an amplifier as mentioned above, not only a weak detection signal but also a detection signal that is originally not weak are amplified. Then, it is assumed that some amplified voltage values may exceed a range of value that can be used for a process performed by the tactile sensation controller. In this manner, if the amplified voltage value exceeds the range that can be processed by the tactile sensation controller, the tactile sensation controller may not process the voltage value correctly or, what is worse, the tactile sensation controller may be adversely affected.

Therefore, in the present embodiment, the amplifier is controlled to change the ratio to be amplified of the data based on pressure such that, even if the signal detected by the pressure detector is amplified, the inconvenience caused by the amplification will not affect the controller.

Figure 3:
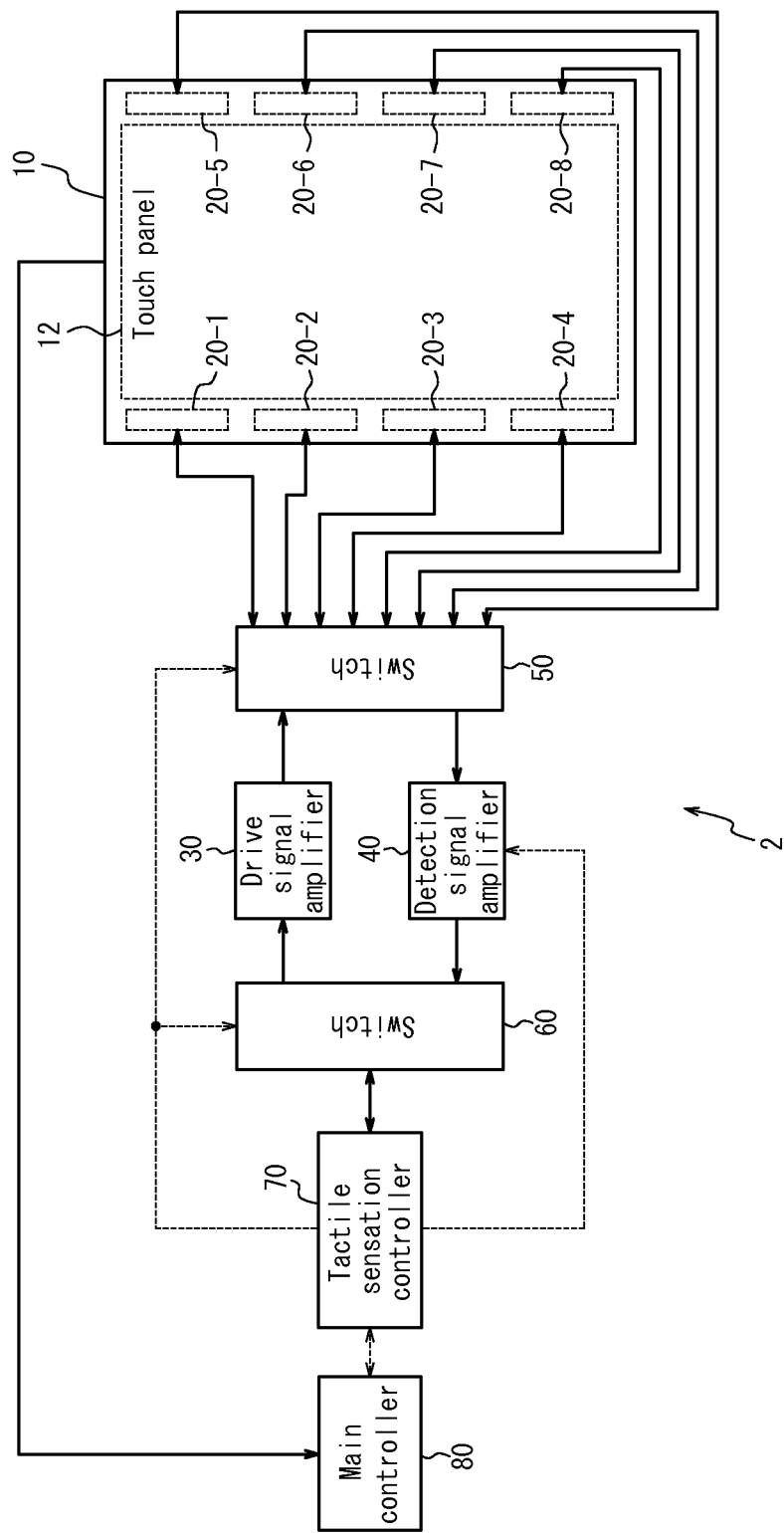
FIG. 3 is a function block diagram of an electronic device according to a second embodiment of the present invention.

FIG. 3 is a function block diagram of the electronic device according to the second embodiment of the present invention. As illustrated in FIG. 3, the electronic device 2 includes a touch panel 10, pressure detectors 20-1 to 20-8, a drive signal amplifier 30, a detection signal amplifier 40, switches 50 and 60, a tactile sensation controller 70 and a main controller 80.

As illustrated in FIG. 3, a drive signal amplifier 30 and a detection signal amplifier 40 are connected via the switches 50 and 60 between the touch panel 10 on which the pressure detectors 20 are mounted and the tactile sensation controller 70. The switches 50 and 60 may be configured using any switching elements or the like. In addition, the drive signal amplifier 30 and the detection signal amplifier 40 may be configured using any amplifiers or the like. With such a configuration, a detection signal of a pressure by a user on the touch panel 10 detected by the pressure detector 20 may be amplified by the detection signal amplifier 40 as needed, then be supplied to the tactile sensation controller 70. In addition, with such a configuration, a drive signal output from the tactile sensation controller 70 may also be amplified by the drive signal amplifier 30 as needed, then be supplied to each pressure detector 20.

In order to realize such a configuration, the switches 50 and 60 switch the signal path such that the drive signal output from the tactile sensation controller 70 will be supplied to each of pressure detectors 20-1 to 20-8 via the drive signal amplifier 30. In addition, the switches 50 and 60 switch the signal path such that the signal detected by the pressure detectors 20-1 to 20-8 will be supplied to the tactile sensation controller 70 via the detection signal amplifier 40. Switching of the signal path by the switches 50 and 60 can be performed based on control of the tactile sensation controller 70. Note that switching of the signal path by the switches 50 and 60 may be performed also based on control of the main controller 80.

Furthermore, in the present embodiment, the detection signal amplifier 40 amplifies a signal to be input with a predetermined gain under control of the tactile sensation controller 70 and outputs the signal. In addition, as further described later, for the detection signal amplifier 40, the gain for amplifying the signal to be input may be designated by the main controller 80. Specifically, the main controller 80 designates a gain for the data based on pressure on the touch panel 10 in response to the position of a contact detected by the touch panel 10. Then, the tactile sensation controller 70 controls the detection signal amplifier 40 to amplify the signal to be input to the designated gain. Note that the main controller 80 may control the detection signal amplifier 40 to amplify the signal to be input to the designated gain.

In the present embodiment, other than the control described in the first embodiment, the main controller 80 controls the tactile sensation controller 70 in response to the position of a contact detected by the touch panel 10. The tactile sensation controller 70 controls the switches 50 and 60 and the detection signal amplifier 40 based on the control by the main controller 80. In addition, the tactile sensation controller 70 can supply a drive signal to vibrate the pressure detector 20 serving as a tactile sensation provider via the switches 50 and 60 and the drive signal amplifier 30. Furthermore, the tactile sensation controller 70 can obtain data based on pressure detected by the pressure detector 20 via the switches 50 and 60 and the detection signal amplifier 40.

Next, the process according to the second embodiment will be described.

Figure 4:
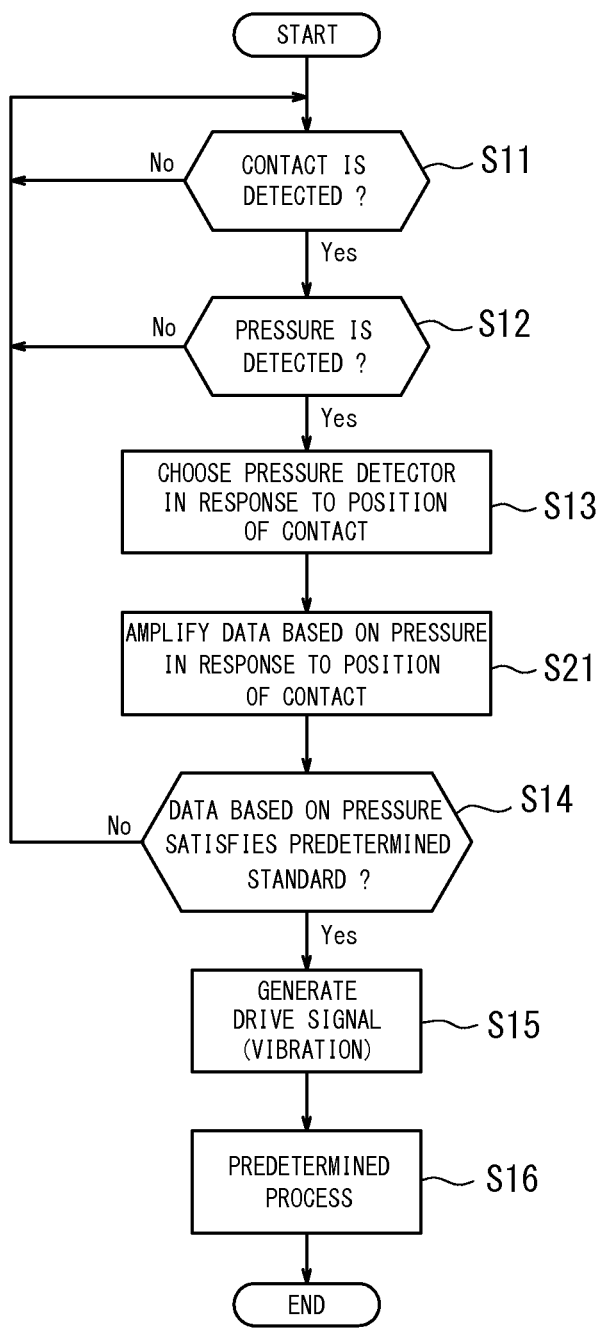
FIG. 4 is a flowchart illustrating a process by the electronic device according to the second embodiment of the present invention.

FIG. 4 is a flowchart illustrating a process by the electronic device 2 according to the second embodiment. For the process according to the present embodiment illustrated in FIG. 4, step S21 is added between step S13 and step S14 in the process of the electronic device 1 according to the first embodiment illustrated in FIG. 2. Other than this point, the process can be realized by the process that is basically the same as the electronic device 1 described in the first embodiment. Thus, the same description as that described in the first embodiment is omitted below as appropriate.

In the present embodiment, when a pressure detector is chosen in step S13, a process in step S21 is performed. In step S21, the main controller 80 obtains the position on the touch panel 10 where a contact is detected, and controls the detection signal amplifier 40 to amplify the signal (data based on pressure) detected by the pressure detector 20 in response to the detected contact position.

In order to realize the process of step S21, the corresponding relationship between the position where a contact is detected and the gain when the detection signal of a pressure is amplified is stored, for example, in the memory unit built in the main controller 80. It is assumed that such a corresponding relationship may differ depending on various conditions such as the touch panel 10, the pressure detector 20 and the housing, and furthermore, the manner each of these members is jointed. Therefore, for example, it is preferred that, upon determination of the configuration manner of each of members constituting the electronic device 2, the corresponding relationship be obtained based on experimental measurements.

It is preferred that how in detail such a corresponding relation is defined with respect to the position where a contact is detected be determined based on the configuration manner of each member constituting the electronic device 2 and various requirements. For example, in some configuration manners of each member constituting the electronic device 2, the ratio to be amplified of the detection value of pressure may not differ so much even if a contact is detected on positions that differ to some extent. On the other hand, in some configuration manners of each member constituting the electronic device 2, the ratio to be amplified of the detection value of pressure may differ much when a contact is detected on positions that differ just a little bit.

In addition, if the above mentioned corresponding relationship can be approximately formulated, only such a formula may be stored in the memory unit built in the main controller 80 and based on the position where a contact is detected, a ratio to be amplified of a detection value of pressure may be calculated.

With respect to the above mentioned corresponding relationship, for example, even if the touch panel is pressed with the same force, when the data based on pressure (detected detection value) on the edge of the touch panel is smaller than that on the central portion thereof, the gain for the edge portion of the touch panel is greater than that for the central portion thereof. In addition, for example, even if the touch panel is pressed with the same force, when the data based on pressure becomes smaller as the distance from the pressure detector 20 increases, a gain is increased as the distance from the pressure detector 20 increases.

If the signal is amplified as needed in step S21, the main controller 80 performs the process of step S14, and after that, the same process as the above mentioned first embodiment is performed.

Thus, in the present embodiment, in addition to the process of the first embodiment, the main controller 80 controls the gain for the data based on pressure on the touch panel 10 in response to the position of a contact detected by the touch panel 10. Therefore, according to the present embodiment, when the detection value of a pressure detected by the pressure detector 20 is amplified, the amplification is performed by taking the position of a pressure on the touch panel 10 into consideration, thus the amplified voltage value will not exceed the range that can be processed by the tactile sensation controller 70. Thus, according to the present embodiment, the tactile sensation controller 70 can also process the detection value of a pressure detected by the pressure detector 20 appropriately, and in addition, even if the detection value of a pressure detected by the pressure detector 20 is amplified, the tactile sensation controller 70 will not be adversely affected.

Therefore, according to the electronic device 2 of the present embodiment, even if a plurality of pressure detectors 20 are mounted, data based on pressure can be obtained appropriately.

Third Embodiment

Here, the technical problem according to the present embodiment will be described in detail again.

In a normal touch panel, even if the touch panel is pressed by a user's finger or the like with the same force, when the pressure is detected on different positions of the touch panel, the detection value detected by the pressure detector may differ (JP2011048698 (A) (hereinafter referred to as Patent Literature 2)). Here, the detection value detected by the pressure detector can be, when the pressure detector is configured using a piezoelectric element, a voltage value that is output from the piezoelectric element. In addition, when the pressure detector is configured using a piezoelectric element, a voltage is applied thereto to cause it to vibrate, thus the pressure detector may serve as a vibrator.

As mentioned above, if the detection value detected with respect to a press performed with the same force on the touch panel differs, in the configuration in which the vibrator is driven when the detection value satisfies a predetermined standard, the force required as a pressure for generating a vibration will not be constant. Then, on the same touch panel, a vibration may be generated on some positions when a user only presses them with a relatively weak force, and on the other positions, a vibration may not be generated unless a user presses them with a relatively strong force, which may cause an inconvenience.

The input apparatus described in Patent Literature 2 can handle such an inconvenience, and adjusts, when a vibrator is driven, a predetermined standard to be satisfied by the detection value detected by the pressure detector in response to the position on the touch panel. Thus, even if the detection value detected on the different positions on the touch panel differs, the pressure for generating a vibration or performing a predetermined process can be constant. Therefore, according to the input apparatus described in Patent Literature 2, the magnitude of a pressure by which a tactile sensation is provided and a predetermined process is performed can be constant on any positions on the touch panel, thus a user feels much less uncomfortable when operating.

However, when a pressure detector is formed by many piezoelectric elements in this manner, if many piezoelectric elements are controlled by a few ICs (tactile sensation controller) to determine whether or not a tactile sensation is provided, a pressure on the touch panel may not be detected appropriately. This is because, when the average of voltage values output from all piezoelectric elements is used as a detection value detected by the pressure detector, if one point on the touch panel is pressed by a user, some positions may be deformed large and some may be deformed a little on the touch panel. In this case, large voltage values output from the piezoelectric elements on the positions where the touch panel is deformed large are averaged by the voltage values output from the piezoelectric elements on other positions where the touch panel is deformed a little, and are reduced. Therefore, in this case, it is preferred that the voltage value detected by the piezoelectric element be amplified by the amplifier before it is input to the tactile sensation controller.

However, if the voltage value is amplified by the amplifier in this manner, not only weak detection signals but also originally not weak detection signals are amplified. Thus, it is assumed that some amplified voltage values may exceed the range of values that can be used for the process performed by the tactile sensation controller. In this manner, when the amplified voltage value exceeds the range that can be processed by the tactile sensation controller, the tactile sensation controller may not process the voltage value correctly and what is worse, the tactile sensation controller may be adversely affected.

Therefore, in the present embodiment, discomfort feeling given to a user when operating the touch panel is decreased, and even if the signal detected by the pressure detector is amplified, an inconvenience caused by the amplification may not affect the controller.

The third embodiment of the present invention can be realized by the configuration that is almost the same as the electronic device 2 described in the second embodiment. Thus, the same description as that described in the first or the second embodiment is omitted below as appropriate.

Figure 5:
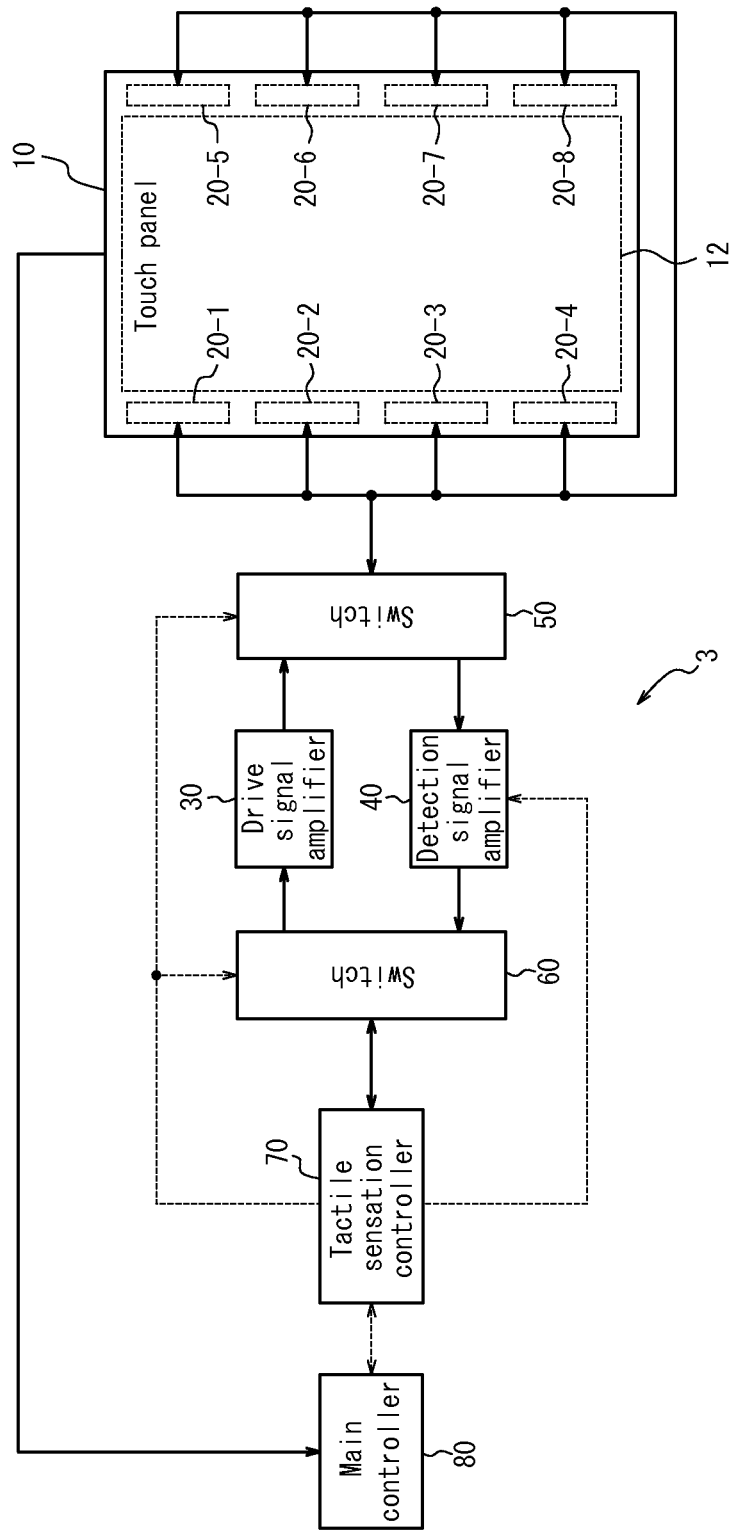
FIG. 5 is a function block diagram of an electronic device according to a third embodiment of the present invention.

FIG. 5 is a function block diagram of an electronic device according to the third embodiment of the present invention. As illustrated in FIG. 5, the electronic device 3 includes a touch panel 10, pressure detectors 20-1 to 20-8, a drive signal amplifier 30, a detection signal amplifier 40, switches 50 and 60, a tactile sensation controller 70 and a main controller 80.

Also in the example illustrated in FIG. 5, as is the case with FIG. 3, the number of pressure detectors 20 disposed is not limited to 4, and may be any number such as 1. For example, when a relatively large number such as 4 or more of the pressure detectors are disposed, it is expected that the effect of the present invention will be more prominent.

As illustrated in FIG. 5, the switches 50 and 60 switch the signal path such that a drive signal output from the tactile sensation controller 70 is supplied to each of pressure detectors 20-1 to 20-8 via the drive signal amplifier 30. Due to the drive signal supplied in this manner, the pressure detectors 20-1 to 20-8 serving as a tactile sensation provider can generate a vibration, thereby providing a tactile sensation to a user's finger or the like. In addition, the switches 50 and 60 switch the signal path such that the signal detected by the pressure detectors 20-1 to 20-8 will be supplied to the tactile sensation controller 70 via the detection signal amplifier 40. The signal path can be switched by the switches 50 and 60 based on the control by the tactile sensation controller 70. Note that the signal path may be switched by the switches 50 and 60 based on the control by the main controller 80.

The main controller 80 controls and manages the whole electronic device 3 as well as each function unit of the electronic device 3. In particular, in the present embodiment, the case where the main controller 80 controls the tactile sensation controller 70 in response to the position of a contact detected by the touch panel 10 is described. As illustrated in FIG. 5, the main controller 80 can obtain the position of a contact detected by the touch panel 10.

The tactile sensation controller 70 controls the switches 50 and 60 and the detection signal amplifier 40 based on the control by the main controller 80. An arrow of broken line connecting each function block in FIG. 1 represents mainly a flow of a control signal. In addition, the tactile sensation controller 70 can supply a drive signal for vibrating the pressure detector 20 serving as a tactile sensation provider via the switches 50 and 60 and the drive signal amplifier 30. Furthermore, the tactile sensation controller 70 can obtain the data based on pressure detected by the pressure detector 20 via the switches 50 and 60 and the detection signal amplifier 40.

Next, the process according to the present embodiment will be described.

FIG. 6 is a flowchart describing a process by the electronic device 3 according to the third embodiment. When the process according to the present embodiment illustrated in FIG. 6 is started, the main controller 80 controls such that a predetermined object such as a key is displayed on the display 12 and an operation by a user to the object is detected.

In addition, upon start of the process according to the present embodiment illustrated in FIG. 6, a predetermined standard to be satisfied by the detection value of pressure detected by the pressure detector 20 when the pressure detector 20 serving as a tactile sensation provider is driven is adjusted in response to the position on the touch panel 10. In order to realize such a configuration, the main controller 80 stores the predetermined standard that differs depending on the position on the touch panel 10, for example, in the memory unit built in the main controller 80. Then, if the detection value of the pressure satisfies the predetermined standard when the pressure detector 20 detects a pressure, the main controller 80 controls the tactile sensation controller 70 such that the pressure detector 20 serving as a tactile sensation provider will provide a tactile sensation.

In the process according to the present embodiment, such a predetermined standard to be satisfied by a detection value detected by the pressure detector 20 when a tactile sensation is provided is previously determined based on, for example, a pressure when a user normally operates the touch panel 10. In addition, it is preferred that such a predetermined standard be altered appropriately after it is set to suit the preferences of a user.

When the process according to the present embodiment is started, the process of steps S11 and S12 can be performed as in the case of the above mentioned first and second embodiments.

When a pressure is detected in step S12, the main controller 80 obtains the position where a contact is detected on the touch panel 10, and controls the detection signal amplifier 40 such that the signal detected by the pressure detector 20 will be amplified in response to the position of the detected contact (step S33). Note that, if the position where a contact is detected on the touch panel 10 is already obtained in step S11, it is not necessary to obtain a position of a contact again in step S33.

In order to realize the process of step S33, the corresponding relationship between the position where a contact is detected and the gain for amplifying the detection signal of a pressure is stored in, for example, the memory unit built in the main controller 80. It is assumed that such a corresponding relationship may differ depending on various conditions such as the touch panel 10, the pressure detector 20 and the housing, and the manner each of these members is joined. Therefore, for example, upon determination of configuration manner of each of members constituting the electronic device 3, the corresponding relationship may be obtained based on experimental measurements.

It is preferred that how in detail such a corresponding relation is defined with respect to the position where a contact is detected be determined based on the configuration manner of each member constituting the above mentioned electronic device 3 and various requirements. For example, in some configuration manners of each member constituting the electronic device 3, the ratio to be amplified of detection value of a pressure may not differ so much even if a contact is detected on positions that differ to some extent. In the same manner, in some configuration manners of each member constituting the electronic device 3, the ratio to be amplified of the detection value of a pressure may differ much when the position where a contact is detected differs just a little bit.

In addition, if the above mentioned corresponding relationship can be approximately formulated, for example, only such a formula may be stored in the memory unit built in the main controller 80 and based on the position where a contact is detected, a ratio to be amplified of a detection value of pressure may be calculated.

With respect to the above mentioned corresponding relationship, for example, even if the touch panel is pressed with the same force, when the data based on pressure (detected detection value) on the edge of the touch panel is smaller than that on the central portion thereof, the gain for the edge portion of the touch panel is greater than that for the central portion thereof. In addition, for example, even if the touch panel is pressed with the same force, when the data based on pressure becomes smaller as the distance from the pressure detector 20 increases, the gain is increased as the distance from the pressure detector 20 increases.

When a signal is amplified as needed in step S33, the main controller 80 determines whether or not the data based on pressure detected by the pressure detector 20 satisfies a predetermined standard (step S14). Here, when the data based on pressure satisfies the predetermined standard may be when the data based on pressure reaches the predetermined standard, the data based on pressure exceeds the predetermined standard or the data based on pressure that is equal to the predetermined standard is detected.

The following steps S14 to S16 can be performed in the same manner as the above mentioned first and second embodiments.

In this manner, in the present embodiment, the main controller 80 controls the gain for the data based on pressure on the touch panel 10 in response to the position of a contact detected by the touch panel 10. Therefore, according to the present embodiment, when the detection value of a pressure detected by the pressure detector 20 is amplified, the position of a pressure on the touch sensor 10 is taken into consideration, thus the amplified voltage value may not exceed the range that can be processed by the tactile sensation controller 70. Thus, according to the present embodiment, the tactile sensation controller 70 can appropriately process the detection value of a pressure detected by the pressure detector 20, and in addition, even if the detection value of a pressure detected by the pressure detector 20 is amplified, the tactile sensation controller 70 will not adversely affected.

Therefore, according to the electronic device 3 of the present embodiment, even if a plurality of pressure detectors 20 are mounted, data based on pressure can be obtained appropriately. In addition, according to the electronic device 3 of the present embodiment, discomfort feeling given to a user when operating the touch panel is decreased, and even if the signal detected by the pressure detector is amplified, an inconvenience caused by the amplification may not affect the controller.

Although the present invention has been described by way of embodiments with reference to the accompanying drawings, it is to be noted that various changes and modifications will be made easily by those skilled in the art based on the disclosure. Therefore, such changes and modifications are to be understood as included within the scope of the present invention. For example, the functions or the like included in the members, units, steps, or the like may be reordered in any logically consistent way. Further, units, steps, or the like may be combined into one or divided.

For example, in the above mentioned embodiments, an object is displayed on a display 12 disposed on the back side of the touch panel and the touch panel detects a contact by a user. However, the present invention is not limited to such embodiments and can be applied to, for example, an embodiment in which, for example, a display is not provided, and an object is printed directly on a touch face of the touch panel with ink or the like.

Furthermore, the above mentioned pressure detector detects a pressure on the touch face of the touch panel, and for example, can be configured by using any number of strain gauge sensors, piezoelectric elements or the like that experiences a change in physical or electrical characteristics (strain, resistance, voltage or the like) in response to a pressure.

In the above mentioned embodiments, a touch panel is layered on the upper face of the display. The electronic device according to the present invention does not limited to such configuration, and the touch panel and the display may be separated. However, with the configuration in which the touch panel is layered on the upper face of the display, it is easier for a user to recognize the corresponding relationship between the image to be displayed and the area where an operation input is detected and a vibration to be generated.

In addition, in the above mentioned embodiments, for amplification of a drive signal by the drive signal amplifier 30, detailed description is not given except for amplifying a drive signal as needed. However, as in the case where the detection signal amplifier 40 according to the present embodiment changes the gain and amplifies the signal under control of the tactile sensation controller 70, the drive signal amplifier 30 may also change the gain of the drive signal in response to the position where a contact is detected under control of the tactile sensation controller 70.

Furthermore, the above mentioned embodiments are described assuming that the data based on pressure is a voltage value. However, in the present invention, the data based on pressure is not limited to a voltage value, and can be, for example, a resistance value, a strain value (amount), a pressure value (load value) or the like.

REFERENCE SIGNS LIST 1, 2, 3 Electronic device
10 Touch panel
12 Display
20 Pressure detector
30 Drive signal amplifier
40 Detection signal amplifier
50, 60 Switch
70 Tactile sensation controller
80 Main controller

The invention claimed is:

1. An electronic device, comprising:
a touch panel configured to detect a position of a contact;
a tactile sensation controller;
a controller; and
a plurality of pressure detectors configured to detect a pressure on the touch panel, wherein
the plurality of pressure detectors is mounted on the touch panel;
the touch panel is divided into a plurality of portions, and each portion among the plurality of portions corresponds to one pressure detector among the plurality of pressure detectors;
the controller is configured to:
obtain the position of the contact detected by the touch panel,
select, from among the plurality of pressure detectors, a pressure detector for detecting a pressure on the touch panel, on the basis of the position of the contact obtained, wherein both the touch panel and the pressure detectors are active when the controller selects the pressure detector for detecting the pressure on the touch panel, and
control the tactile sensation controller to generate a predetermined drive signal in response to a determination that the pressure detected by the selected pressure detector satisfies a predetermined criterion, and
the plurality of pressure detectors is further configured to generate vibrations in response to the predetermined drive signal generated by the tactile sensation controller and supplied to each of the plurality of pressure detectors.

2. An electronic device, comprising:
a touch panel configured to detect a contact and a position of the contact;
a tactile sensation controller;
a plurality of pressure detectors mounted on the touch panel, wherein the touch panel is divided into a plurality of portions, and each portion among the plurality of portions corresponds to one pressure detector among the plurality of pressure detectors; and
a controller configured to:
obtain the position of the contact detected by the touch panel,
on the basis of the obtained position of the contact detected by the touch panel,
select, from among the plurality of pressure detectors, a pressure detector to detect data indicating a pressure applied to the touch panel by the contact, on the basis of the obtained position of the contact detected by the touch panel,
determine a gain for the detected data indicating the pressure applied to the touch panel, modify the detected data in accordance with the determined gain, and
control the tactile sensation controller to generate a predetermined drive signal in response to a determination that the modified data satisfy a predetermined criterion,
wherein the plurality of pressure detectors is further configured to generate vibrations in response to the predetermined drive signal generated by the tactile sensation controller and supplied to each of the plurality of pressure detectors.

3. The electronic device of claim 2, wherein
in response to the obtained position of the contact being at a central portion of the touch panel, the controller is configured to determine the gain for the detected data to have a first value, and
in response to the obtained position of the contact being at an edge portion of the touch panel, the controller is configured to determine the gain for the detected data to have a second value greater than the first value.

4. The electronic device of claim 2, wherein
when vibrations are generated by the plurality of pressure detectors in response to the predetermined drive signal, the controller is further configured to perform a predetermined process on the basis of the modified data satisfying the predetermined criterion.

* * * * *